United States Patent [19]
Goebel et al.

[11] Patent Number: 5,465,708
[45] Date of Patent: Nov. 14, 1995

[54] TROUGH-SHAPED COLLECTOR

[75] Inventors: Olaf Goebel, Stuttgart; Klaus Hennecke, Lohmar, both of Germany

[73] Assignee: Deutsche Forschungsanstalt fuer Luft- und Raumfahrt e.V., Bonn, Germany

[21] Appl. No.: 307,904

[22] Filed: Sep. 16, 1994

[30] Foreign Application Priority Data

Sep. 18, 1993 [DE] Germany .......................... 43 31 785.5

[51] Int. Cl.⁶ ........................................ F24J 2/32
[52] U.S. Cl. ...................... 126/635; 126/694; 126/652; 165/104.26
[58] Field of Search ................... 126/635, 692, 126/651, 652, 654, 655, 656, 636, 637, 684, 693, 638; 165/104.26

[56] References Cited

U.S. PATENT DOCUMENTS

| | | | |
|---|---|---|---|
| 1,661,473 | 3/1928 | Goddard et al. | |
| 3,923,038 | 12/1975 | Cutchaw | 126/635 |
| 4,153,039 | 5/1979 | Carroll | |
| 4,214,572 | 7/1980 | Gonder | |
| 4,217,882 | 8/1980 | Feldman, Jr. | 165/104.26 |
| 4,296,735 | 10/1981 | Liorach | 126/692 |
| 4,320,246 | 3/1982 | Russell | 126/636 |
| 4,505,260 | 3/1985 | Metzger | 126/683 |
| 4,909,316 | 3/1990 | Kamel et al. | 165/104.26 |
| 4,911,144 | 3/1990 | Godett et al. | 126/636 |

FOREIGN PATENT DOCUMENTS 3025826  1/1981  Germany .

*Primary Examiner*—James C. Yeung
*Attorney, Agent, or Firm*—Barry R. Lipsitz

[57] ABSTRACT

A trough-shaped collector for solar radiation for steam generation. A trough-shaped mirror extending in a longitudinal direction receives and reflects radiation onto an absorber line enclosing within its interior a steam generator tube. Heat is transferred transversely from the absorber line to the steam generator tube by a heat pipe structure.

11 Claims, 4 Drawing Sheets

TROUGH-SHAPED COLLECTOR

BACKGROUND OF THE INVENTION

The invention relates to a trough-shaped collector for radiation, in particular for solar radiation, comprising a trough-shaped mirror extending in a longitudinal direction and reflecting the radiation into a focus region, and an absorber pipe member extending in the longitudinal direction in the focus region of the trough-shaped mirror, a heat transport medium flowing through the pipe member for taking away the resulting heat and the pipe member having a recess extending in its longitudinal direction and being located between two side edges, this recess facing the trough-shaped mirror with an opening formed by the side edges and being limited by an absorber screen bearing an absorber surface.

Trough-shaped collectors of this type are known from U.S. Pat. No. 1,661,473.

In these trough-shaped collectors, the absorber line is preferably formed by a C-shaped absorber pipe member which, for its part, bears the absorber surface. The problem with such absorber pipe members is that the C-shaped space for the heat transport medium does not allow any efficient operation thereof.

The object underlying the invention is therefore to improve a trough-shaped collector of the generic type such that this can be operated as efficiently as possible.

SUMMARY OF THE INVENTION

This object is accomplished in accordance with the invention, in a trough-shaped collector of the type described at the outset, in that the absorber pipe member has an interior, that a vaporizer tube having an essentially round cross section extends in the interior of the absorber pipe member for transporting heat in the longitudinal direction and that the vaporizer tube is thermally coupled to the absorber pipe member via a heat transport medium present between the vaporizer tube and the absorber screen for transporting heat transversely to the longitudinal direction.

Such provision of a separate vaporizer tube allows the dimensions of this vaporizer tube to be adapted to the given circumstances for transporting heat away as effectively as possible by means of the heat transport medium and, thus, this vaporizer tube may be designed independently of the cross section of the focus region so that the absorber surface can be dimensioned independently of the cross section of the vaporizer tube.

The advantage of the inventive solution is therefore to be seen in the fact that due to the arrangement of the vaporizer tube separate from the absorber pipe member the vaporizer tube can, on the one hand, be dimensioned with respect to its stability for high steam pressures without needing to take the shape of the absorber surface into consideration.

In addition, the coupling between absorber surface and vaporizer tube by means of the heat transport medium can expediently accomodate to an acceptable deformation of the vaporizer tube due to uneven heating.

In this respect, it is particularly advantageous for the heat transport medium to heat the vaporizer tube uniformly in circumferential direction.

This means that the problems which result from uneven deformation of the vaporizer tube due to uneven heating thereof are solved.

With respect to the design of the vaporizer tubes, no details have so far been given. In a particularly advantageous embodiment, for example, the vaporizer tubes are designed for pressure of more than 25 bar, preferably to vaporize water directly and use the steam for driving steam turbines.

With respect to the design of the absorber surface, no details have so far been given. In the simplest case, the recess could have an approximately rectangular or trapezoidal cross section. It is, however, particularly advantageous for the recess to have a channel with a curved cross section. In this case, the absorber surface is preferably a surface borne by the channel and therefore a concave surface.

In this respect, it is particularly expedient for the absorber surface to extend from one side edge of the channel to the other side edge.

With respect to the arrangement of the channel, no additional details have been given in conjunction with the preceding explanations of the individual embodiments. In an advantageous embodiment, for example, the channel is seated at its rim on a support of the absorber line.

The support could be any type of supporting construction. It is, however, particularly expedient for the support to be a cylinder casing segment extending in the longitudinal direction since this is, from a constructional point of view, particularly simple to produce and connect with the channel.

In a particularly advantageous embodiment, the support and the channel together form the absorber pipe member and enclose between them an interior of the absorber pipe member.

The inventive solution allows, in particular, the absorber surface to be adapted to an extension of the focus region transversely to the longitudinal axis, preferably to dimension this essentially equal to the extension of the focus region transversely to the longitudinal direction.

In order to ensure, in this case, an efficient heat transport between the channel bearing the absorber surface and the vaporizer tube, it is preferable for a heat pipe thermally coupling the channel and the vaporizer tube essentially in a direction transversely to the longitudinal direction to be arranged between the channel and the vaporizer tube.

The heat pipe could be a constructional element which is independent of the channel and the vaporizer tube and is in thermal contact therewith. It is, however, particularly advantageous for the interior of the absorber pipe member which surrounds the vaporizer tube to form a vapor chamber of the heat pipe.

In addition, the heat pipe is, in the simplest case, constructed such that the vaporizer tube and the absorber pipe member represent housing elements thereof.

An effective action of the heat pipe can be attained when the channel bears a capillary structure of the heat pipe, which keeps a heat transfer medium of the heat pipe absorbed, on a side facing away from the absorber surface.

In this example, the vaporizer tube forms, in particular, in the preferred case a condensation surface for the heat transfer medium with an outer side so that the heat pipe, in this case, heats the vaporizer tube uniformly in circumferential direction.

Moreover, in an additional, advantageous embodiment the support is likewise coupled to the channel by the heat pipe so that the temperature of the support walls corresponds essentially to that of the channel bearing the absorber surface.

In order to avoid any removal of heat from the support, it is preferable for the support to be covered with an insulation layer so that heat will not be discharged to the surroundings from this.

Furthermore, any discharge of heat to the surroundings by convection can be reduced by having a cover which is permeable to radiation engaging over the absorber surface.

This cover is arranged, in the simplest case, such that it preferably extends arcuately over the absorber surface.

In another, advantageous possibility, the absorber pipe member is arranged as a whole in a protective casing which represents a cover for the absorber surface with a partial section which is permeable to radiation.

An insulating gas at low pressure or under vacuum is preferably provided between the cover and the absorber surface.

An inventive absorber surface can, in principle, be arranged independently of any tracking movement of the trough-shaped mirror. It is, however, particularly advantageous for the absorber surface to be coupled to a tracking movement of the trough-shaped mirror.

This may be realized, in the simplest case, by the absorber surface being rigidly coupled to a frame of the trough-shaped mirror which is movable in order to carry out the tracking movement.

The heat transport medium is preferably supplied to and/or removed from the absorber line which is movable for tracking via a rotary supply line, even better via a torsion pipe to avoid rotary seals.

Additional features and advantages of the invention are the subject matter of the following description as well as the drawings of several embodiments.

DETAILED DESCRIPTION OF THE INVENTION

Figure 1:
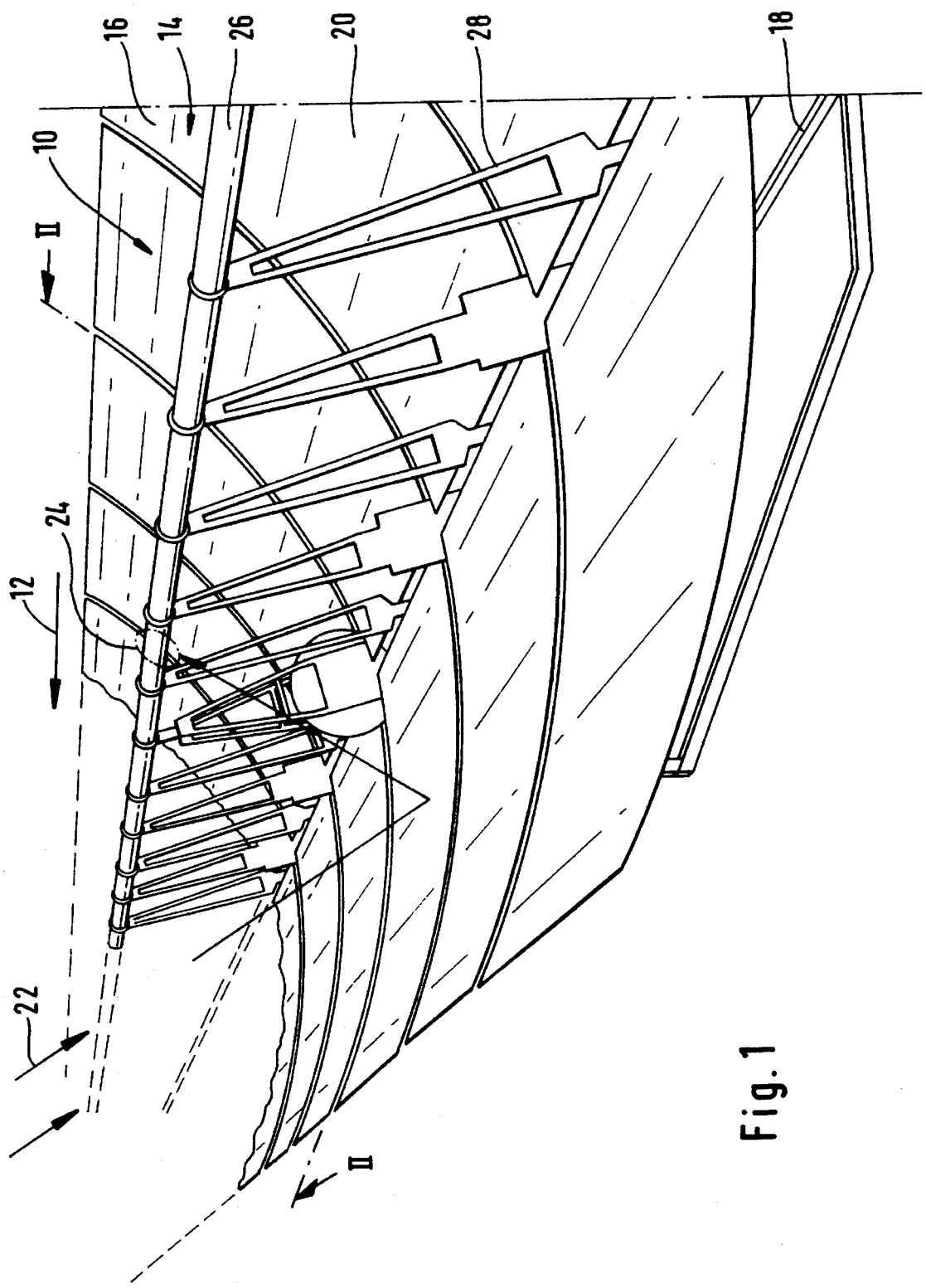
FIG. 1 is a perspective illustration of an inventive trough-shaped collector.
Figure 2:
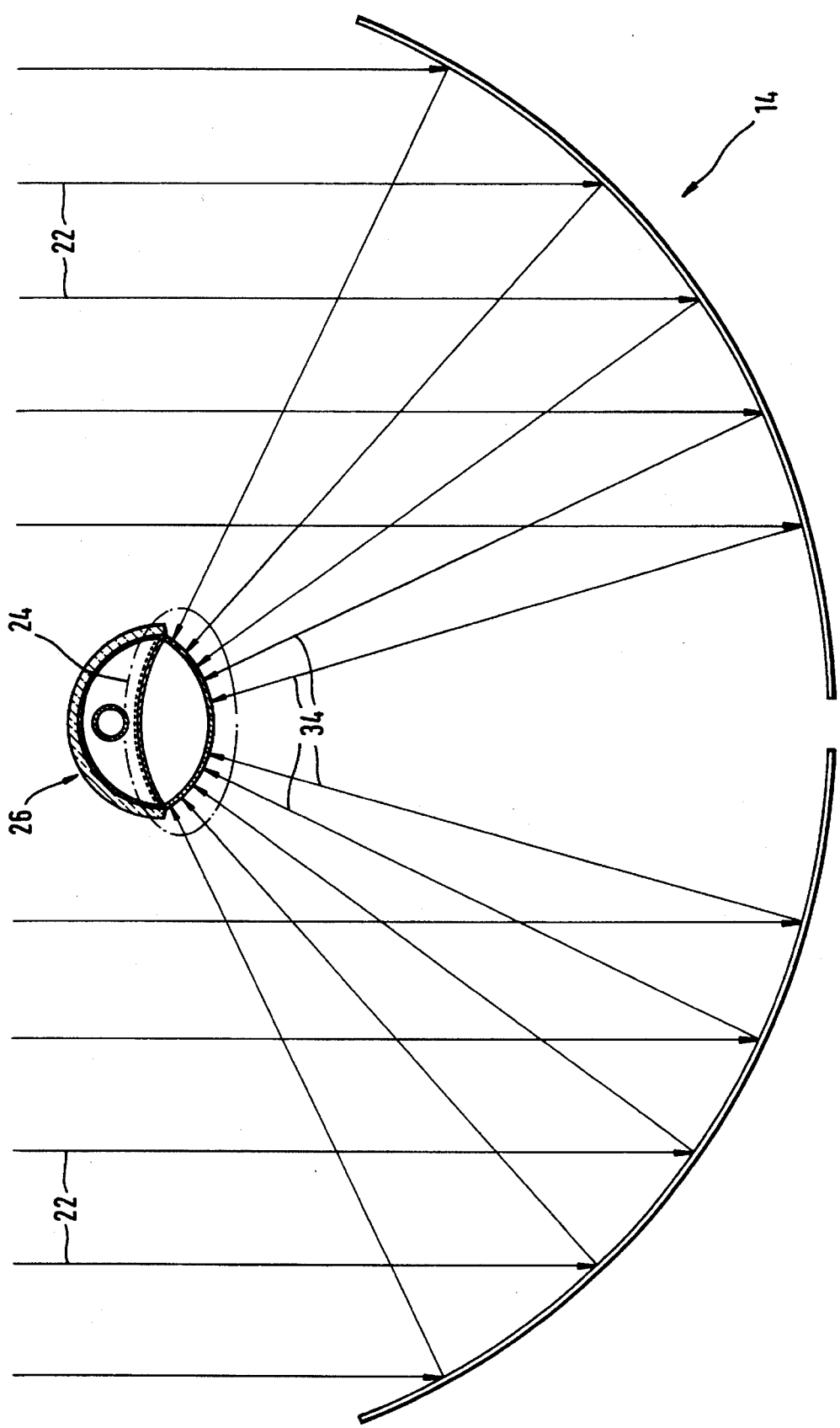
FIG. 2 is a section along line II—II in FIG. 1.

An embodiment of an inventive trough-shaped collector illustrated as a whole in FIG. 1 and designated as 10 extends in a longitudinal direction 12, for example over several hundred meters, and comprises a trough-shaped mirror 14 which is preferably designed as a parabolic mirror and constructed of a plurality of mirror elements 16 which are held on a mirror frame 18 and, together, form a mirror surface 20 which extends in the longitudinal direction 12 and is parabolic transversely to the longitudinal direction 12.

The parabolic mirror surface 20 reflects incoming solar radiation 22 into a focal line 24 which extends in the longitudinal direction 12 and in which an absorber line designated as a whole as 26 is located. This absorber line is rigidly held via support struts 28 on the mirror frame 18, which is pivotable to align the mirror surface 20 exactly in relation to the solar radiation 22. The support struts 28 are arranged one after the other at regular intervals in the longitudinal direction in order to hold the absorber line 26 precisely aligned in the focal line 24.

Figure 3:
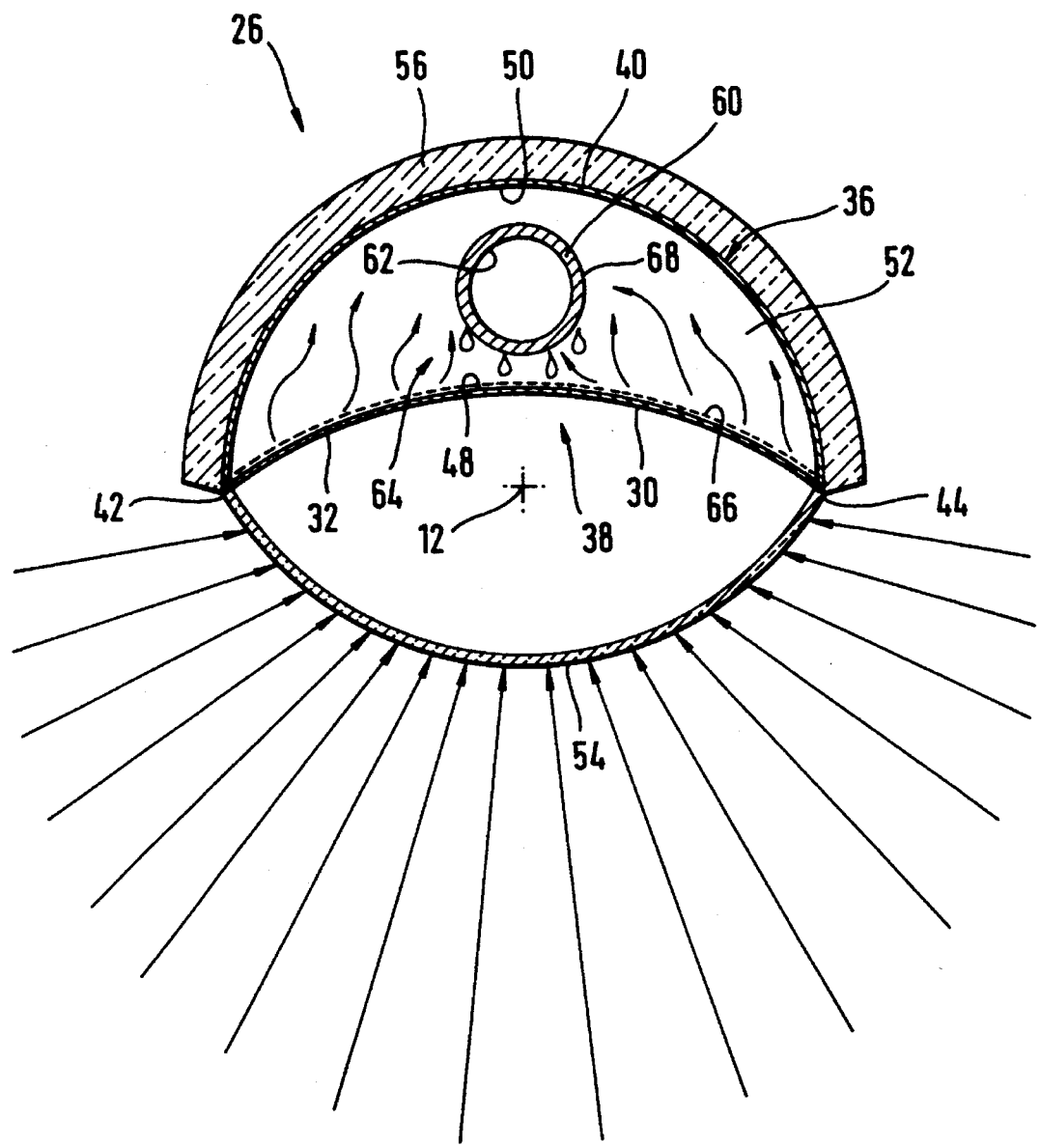
FIG. 3 is an enlarged cross section through a first embodiment of an inventive absorber line and FIG. 4 is a cross section similar to FIG. 3 through a second embodiment of an inventive absorber line.

As illustrated in FIG. 3, the absorber line 26 comprises an absorber screen 30 which bears an absorber surface 32 impinged by solar radiation 34 reflected from the mirror surface 20.

One embodiment of the inventive absorber screen 30 having an absorber surface 32 which absorbs the solar radiation 34 reflected by the mirror surface 20 is preferably part of an absorber pipe member designated as a whole as 36, which comprises a channel 38 and a support 40 for the channel 38.

The channel 38 extends between two side edges 42 and 44, which extend parallel to the longitudinal direction 12, with a concave cross section which extends transversely to the longitudinal direction 12 and lies symmetrically between the side edges 42 and 44. A concave surface of the channel 38 thereby represents the absorber surface 32 so that the channel 38 forms the absorber screen 30.

The support 40 is, for its part, designed as a cylinder casing segment which likewise extends between the side edges 42 and 44, namely with such a radius that an interior 52, which is crescent-shaped in cross section transversely to the longitudinal direction 12, remains between an inner wall 48 of the channel 38 and an inner wall 50 of the support 40. This interior represents the interior of the absorber pipe member 36. The support 40 and the channel 38 are preferably parts which are connected, preferably welded, to one another in the region of the side edges 42 and 44 and together form the channel 38.

In order to thermally insulate the absorber surface 32 in relation to the surroundings, a glass cover 54 made of glass which is transparent for the solar radiation 34, preferably transparent for visible light and reflecting infrared radiation, preferably rises above the channel 38, namely between the side edges 42 and 44. This glass cover is designed to be dome-shaped in cross section transversely to the longitudinal direction 12 and insulating gas at a low pressure or under vacuum is preferably provided between the glass cover 54 and the absorber surface 32.

Moreover, an insulation layer 56, which covers the support 40 from side edge 42 to side edge 44 and reduces any cooling in the region of the support 40, is provided for insulating the support 40 which is arranged on a side of the channel 38 facing away from the mirror surface 20.

The frame 52 of the inventive absorber pipe member 36 is penetrated by a vaporizer tube 60 which conveys a heat transport medium in a tube interior 62 for taking away the heat.

For the thermal coupling between the vaporizer tube 60 and the absorber screen 30, the interior 52 of the absorber pipe member 36 which surrounds the vaporizer tube 60 is designed as a vapor chamber of a heat pipe designated as a whole as 64. In the simplest case, from a constructional point of view, both the support 40 and the vaporizer tube 60 form housing elements of a housing of this heat pipe 64.

The heat pipe 64 comprises, in addition, a capillary structure 66 which is arranged on the inner wall 48 and is saturated by a heat transfer medium, preferably potassium. The capillary structure 66 holding the heat transfer medium and the absorber screen 30 together form a vaporizing region of the heat pipe 64 while a condensate region is formed by a circumferential surface of the vaporizer tube 60 which acts as condensation surface 68. The heat transfer medium condenses on this condensation surface 68 and drips, in turn, from the condensation surface 68 back to the capillary structure 66 which absorbs this and distributes it over its entire extension on the inner wall 48 of the absorber screen 30.

Moreover, the inner wall 50 of the support 40 likewise forms a condensation surface to the extent that this does not have the same temperature as the absorber screen 30 and so the support 40 is also held by the heat pipe 64 at the same temperature as the absorber screen 30 and, furthermore, transports the heat efficiently to the vaporizer tube 60 and the heat is passed via this to the heat transport medium conveyed in the tube interior 62.

Figure 4:
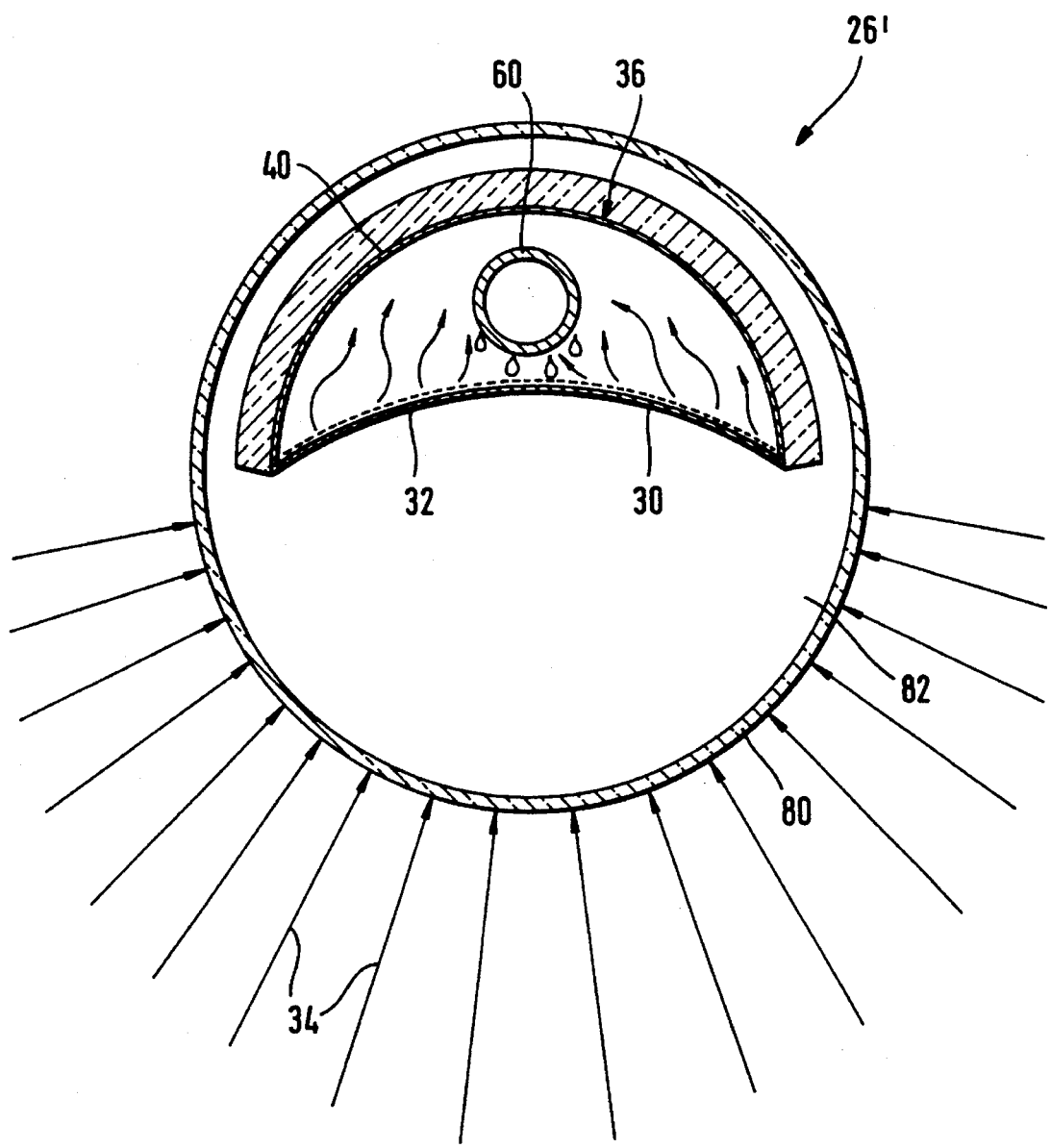

In a second embodiment of an inventive absorber line, designated as a whole as 26' in FIG. 4, the absorber pipe member 36 is designed in the same way as in the first embodiment.

A protective casing 80 is, however, provided instead of the glass cover 54. This protective casing engages around the absorber pipe member 36 and is preferably constructed as a whole from a glass transparent for the solar radiation 34. This protective casing 80 is preferably arranged coaxially to the support 40 and therefore engages over the absorber surface 32 as well as the support 40.

Gas at a low pressure or under vacuum is preferably provided in a space 82 between the protective casing 80 and the absorber pipe member 36 in order to achieve as good an insulation of the absorber pipe member 36 as possible, in particular of the absorber screen 30 thereof.

As for the rest, the absorber pipe member 36 is of the same design as in the first embodiment and so individual elements of this have the same reference numerals and with respect to the description of these elements reference can be made to the comments on the first embodiment.

All the embodiments of the inventive solution described above operate such that the absorber line 26 or 26' is rigidly coupled to the mirror frame 18 of the trough-shaped mirror via the support struts 28 so that when the mirror frame 18 is pivoted to track the direction of incidence of the solar radiation 22 the absorber line 26 or 26' is pivoted with it so that the alignment of the absorber surface $2 relative to the mirror surface 20 is and remains unchanged.

For this purpose, the absorber pipe member 36 or the vaporizer tube 60 is connected via a rotary supply line or a torsionable pipe with a respective inlet and/or outlet for the heat transport medium.

Water is preferably used as heat transport medium, whereby this water is vaporized in the vaporizer tubes, in particular high-pressure vaporizer tubes, at a pressure of more than 25 bar to drive the steam turbines with this steam.

The absorber surface 32 preferably extends over the entire extension of the focus region 24 transversely to the longitudinal direction 12 so that the entire solar radiation 22 which hits the mirror surface 20 impinges on the absorber surface 32 as reflected solar radiation 34 and is absorbed and coupled into the vaporizer tube 60 via the heat pipe 64.

What is claimed is:

1. An elongated collector for collecting solar radiation for steam generation, said collector comprising:
   (a) a trough-shaped mirror extending in a longitudinal direction for reflecting solar radiation into a focus region extending in the longitudinal direction;
   (b) an absorber line comprising:
      (1) a longitudinally extending support having a recess with longitudinally extending edges; and
      (2) an absorber surface extending across and along said recess of said support and joining to said longitudinal edges to form an inner surface of said recess, said absorber surface extending in the focus region so as to intercept radiation reflected from said trough-shaped mirror;
   (c) a steam generator tube extending longitudinally within said absorber line for generating steam from water guided therein in said longitudinal direction, and
   (d) a heat pipe structure between said absorber line and said steam generator tube for transferring heat transversely from said absorber surface to said steam generator tube, said absorber surface being the heat source and said steam generator tube being the heat sink of said heat pipe structure.

2. The collector as defined in claim 1, wherein the recess has a curved cross-section.

3. The collector as defined in claim 1, wherein the absorber surface is a longitudinally extending surface concave in a direction transverse to said longitudinal direction.

4. The collector as defined in claim 1, wherein the support is a cylinder casing segment extending in the longitudinal direction.

5. The collector as defined in claim 1, wherein the absorber surface extends transversely to the longitudinal direction essentially over the same distance as the focus region.

6. The collector as defined in claim 1, further comprising a capillary structure of the heat pipe on a side facing away from the absorber surface.

7. The collector as defined in claim 1, wherein an outer side of the steam generator tube forms a condensation surface for a heat transfer medium of the heat pipe.

8. The collector as defined in claim 1, further comprising an insulation layer covering the support.

9. The collector as defined in claim 1 further comprising a transparent cover over the absorber surface.

10. The collector as defined in claim 1, further comprising a protective casing around the absorber line.

11. The collector as defined in claim 1, further comprising support struts coupling the absorber line to the trough-shaped mirror wherein the absorber surface is coupled to a tracking movement of the trough-shaped mirror.

\* \* \* \* \*